United States Patent
Chen et al.

(10) Patent No.: US 8,928,854 B2
(45) Date of Patent: Jan. 6, 2015

(54) LIQUID CRYSTAL LENS STRUCTURE AND ELECTRICAL CONTROLLING LIQUID CRYSTAL GLASSES STRUCTURE THEREOF

(71) Applicant: Liqxtal Technology Inc., Tainan (TW)

(72) Inventors: Hung-Shan Chen, Taichung (TW); Yi-Hsin Lin, Zhubei (TW)

(73) Assignees: Liqxtal Technology Inc., Tainan (TW); National Chiao Tung University, Hsinchu (TW)

( * ) Notice: Subject to any disclaimer, the term of this patent is extended or adjusted under 35 U.S.C. 154(b) by 203 days.

(21) Appl. No.: 13/644,836

(22) Filed: Oct. 4, 2012

(65) Prior Publication Data

US 2014/0016080 A1  Jan. 16, 2014

(30) Foreign Application Priority Data

Jul. 11, 2012 (TW) .............................. 101125012 A (51) Int. Cl.
*G02F 1/1347* (2006.01)
*G02F 1/29* (2006.01)
*G02B 3/08* (2006.01)

(52) U.S. Cl.
CPC .... *G02F 1/29* (2013.01); *G02B 3/08* (2013.01)
USPC .............. 349/200; 349/74; 349/158; 349/160

(58) Field of Classification Search
CPC ........... G02F 1/13; G02F 1/29; G02F 1/1313; G02F 1/1334; G02F 1/1347; G02F 1/13471; G02F 1/13476; G02F 201/13775; G02B 3/14; G02B 3/08
USPC ...................... 349/86, 139, 158, 200, 74, 160
See application file for complete search history.

(56) References Cited

U.S. PATENT DOCUMENTS

| | | | | |
|---|---|---|---|---|
| 2007/0229754 A1* | 10/2007 | Galstian et al. | ................ | 349/200 |
| 2010/0060823 A1* | 3/2010 | Ju et al. | ............................ | 349/74 |
| 2011/0141341 A1* | 6/2011 | Lin et al. | ........................ | 348/345 |
| 2011/0181797 A1* | 7/2011 | Galstian et al. | .................... | 349/2 |
| 2012/0140128 A1* | 6/2012 | Lin et al. | ........................ | 349/13 |

* cited by examiner

*Primary Examiner* — Dung Nguyen
*Assistant Examiner* — Tai Duong
(74) *Attorney, Agent, or Firm* — Saliwanchik, Lloyd & Eisenschenk (57) ABSTRACT

A liquid crystal lens structure and an electrical controlling liquid crystal glasses structure are disclosed. The liquid crystal lens structure includes first electrode layer, compositing layer, second electrode layer and third electrode layer. The compositing layer includes first alignment layer, first liquid crystal layer, including thin-film layer, second liquid crystal layer and second alignment layer. The first alignment layer is disposed on the first electrode layer. The first liquid crystal layer is disposed on the first alignment layer. The compositing thin-film layer includes liquid crystal and polymer material and the compositing thin-film layer is disposed on the first liquid crystal layer. The second liquid crystal layer is disposed on the compositing thin-film layer. The second alignment layer is disposed on the second liquid crystal layer. The second electrode layer is disposed on the second alignment layer. The third electrode layers are disposed on the second electrode layer.

12 Claims, 11 Drawing Sheets

LIQUID CRYSTAL LENS STRUCTURE AND ELECTRICAL CONTROLLING LIQUID CRYSTAL GLASSES STRUCTURE THEREOF

CROSS-REFERENCE TO RELATED APPLICATION

This application claims the benefit under 35 U.S.C. §119 of Taiwanese Patent Application No. 101125012, filed Jul. 11, 2012, which is hereby incorporated by reference in its entirety.

BACKGROUND

1. Field of the Invention

The present invention generally relates to a liquid crystal lens structure, in particular to a liquid crystal lens structure without polarization sheets improving polarization problem and merely having singular positive lens or negative lens effect and its electrical controlling liquid crystal glasses structure.

2. Description of the Related Art

Liquid crystal (LC) has good electro-optical property and lower operating voltages and is widely utilized to produce electro-optic modulators. For example, a liquid crystal lens utilizes electric fields driving liquid crystal molecules distributed in a liquid crystal layer to change the direction of major axes of the liquid crystal molecules in accordance with the intensity of the electric field, thereby achieving the arrangement structure that is similar to the gradient index lens. The liquid crystal lens may be applied to technical fields of devices, such as cameras, mobile phone cameras or stereo image processing, thereby achieving the purpose of light weight and quick zooming.

Currently, the liquid crystal lens without using polarization sheets may be a structure having dual layers that are orthogonally stacked to each other. Both liquid crystal layers in the structure may be divided by utilizing glasses that are processed with orthogonal alignment or liquid crystal polymer thin films that are processed with two-layered orthogonal alignment.

However, the conventional liquid crystal lens without polarization sheets utilizes glasses as isolating elements of the liquid crystal layer, its structure is thicker and heavy and has greater volume and higher operating voltage. Further, for the liquid crystal lens in which the polarization sheets are not required, if two layers of liquid crystal polymer thin films are utilized for isolating the liquid crystal layer, the thickness of the two layers of liquid crystal polymer thin films must be identical. However, the liquid crystal thin film is hardly produced at great area of the same thickness. Different thicknesses may cause polarization problem. While overcoming the foregoing problem, many cases must be added with polarization sheets. Moreover, if the liquid crystal lens without polarization sheets is applied to an electrical controlling liquid crystal glasses, it has to be operated either as a positive lens or a negative lens.

BRIEF SUMMARY

Therefore, it is a primary objective of the present invention to provide a liquid crystal lens structure and the electrical controlling liquid crystal glasses structure thereof to overcome the problem with respect to bigger volume and higher operating voltages caused by a conventional liquid crystal lens, which is made of glasses, without polarization sheets and the problem of merely having either the positive lens or the negative lens by applying the liquid crystal lens, which does not have polarization sheets, in the electrical controlling liquid crystal glasses.

To achieve the foregoing objective, the present invention provides a liquid crystal lens structure comprising a first electrode layer, a composite layer, a second electrode layer and a third electrode layer. The composite layer comprises a first alignment layer, a first liquid crystal layer, a composite thin film layer, a second liquid crystal layer and a second alignment layer. The first alignment layer is disposed on the first electrode layer. The first liquid crystal layer is disposed on the first alignment layer. The composite thin film layer may include a liquid crystal and a polymer material. The composite thin film layer is disposed on the first liquid crystal layer. The second liquid crystal layer is disposed on the composite thin film layer. The second alignment layer is disposed on the second liquid crystal layer. The second electrode layer is disposed on the second alignment layer. The third electrode layer is disposed on the second electrode layer. The alignment directions of the first alignment layer and the second alignment layer may be orthogonal to each other. The alignment directions of the liquid crystal and the polymer material in the composite thin film layer may be orthogonal to each other.

Preferably, the liquid crystal lens structure according to the invention further comprises a first substrate and a second substrate. The first electrode layer is disposed on the first substrate. The second substrate is disposed between the second alignment layer and the second alignment Layer. square Preferably, materials of the first substrate and the second substrate may include metal, high impedance materials of 0.1 MΩ/□ to 100MΩ/□ (MΩ/square) or a glass.

Preferably, the first substrate and the second substrate are designed as curvature structures of an ellipse, a circle or a Fresnel structure.

Preferably, the first liquid crystal layer and the second liquid crystal layer are made of different liquid crystal materials.

Preferably, the composite thin film layer may include a cholesterol liquid crystal film, a positive dielectric type liquid crystal polymer thin film or a negative dielectric type liquid crystal polymer thin film.

Preferably, the composite thin film layer is applicable to structures of a non-uniform liquid crystal lens, a high impedance liquid crystal lens, a curvature electrode liquid crystal lens, a pixelated liquid crystal lens, a Fresnel liquid crystal lens or a dielectric distributed polymer film liquid crystal lens.

Preferably, the structure is applicable in systems of a pico-projector, a mobile phone imaging system or other electronically controlled focal length components.

Preferably, the liquid crystal lens structure is electrically controlled to form a positive lens or a negative lens or a combination thereof.

To achieve the foregoing objective, the present invention further provides an electrical controlling liquid crystal glasses structure comprising a corrective lens and a liquid crystal lens structure. The liquid crystal lens structure may be disposed to any surface of the corrective lens or doped into the corrective lens.

The liquid crystal lens structure and its electrical controlling liquid crystal glasses structure according to the invention may have one or more advantages as the following:

1. The liquid crystal lens structure and its electrical controlling liquid crystal glasses structure do not need to use polarization sheets, thereby improving related conventionally polarization.

2. The invention may replace conventional glasses layers made of glasses and two layers of liquid crystal polymer thin film layers through the composite thin film layer composed of the liquid crystal and the polymer material, thereby improving bigger volume and thicker thickness. Further, the voltage division of non-liquid crystal layers may be reduced to lower the operating voltage.

3. The invention merely uses single voltage to achieve continuous zooming, and its structure is simpler. The efficacy of operating the positive and negative lenses may be achieved while operating in dual voltage.

4. When the composite thin film layer made of the liquid crystal and the polymer material is applied to the electrical controlling liquid crystal glasses structure, the efficacies of correcting nearsightedness, hyperopia, presbyopia or parallax could be simultaneously achieved by utilizing the operation of operating the positive and negative lenses.

5. The polarization independent design depicted in the invention may also be applied to systems of the pico-projector, the mobile phone imaging system or other electronically controlled focal length components.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION

The present invention is described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the size and relative sizes of layers and regions may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the liquid crystal lens structure and the electrical controlling liquid crystal glasses structure thereof according to the present invention will be explained in more detail with reference to the accompanying drawings.

Figure 1:
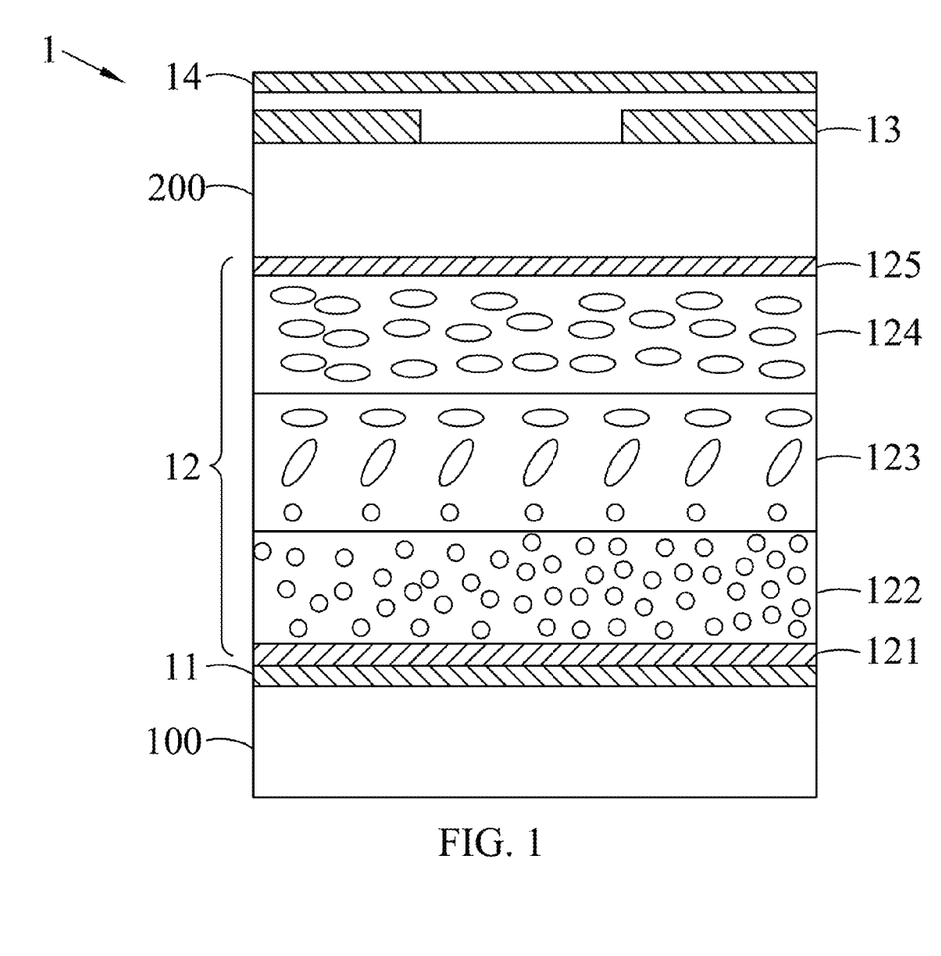
FIG. 1 is a schematic diagram of a liquid crystal lens structure of the present invention.

With reference to FIG. 1, in which a schematic diagram of a liquid crystal lens structure according to the invention is depicted. The liquid crystal lens 1 comprises a first electrode 11, a composite layer 12, a second electrode layer 13 and a third electrode layer 14. The composite layer 12 may include a first alignment layer 121, a first liquid crystal layer 122, a composite thin film layer 123, a second liquid crystal layer 124 and a second alignment layer 125. The first alignment layer 121 is disposed on the first electrode layer 11. The first liquid crystal layer 122 is disposed on the first alignment layer 121. The composite thin film layer 123 may comprise a liquid crystal and a polymer material. The composite thin film layer 123 is disposed on the first liquid crystal layer 122. The second liquid crystal layer 124 is disposed on the composite thin film layer 123. The second alignment layer 125 is disposed on the second liquid crystal layer 124. The second electrode layer 13 is disposed on the second alignment layer 125. The third electrode layer 14 is disposed on the second electrode layer 13. The liquid crystal lens 1 further comprises a first substrate 100 and a second substrate 200. The first electrode layer 11 is disposed on the first substrate 100. The second substrate 200 is disposed between the second alignment layer 125 and the second electrode 13 so as to form the liquid crystal lens 1 through the foregoing arrangement manner.

The alignment directions of the first alignment layer 121 and the second alignment layer 125 are orthogonal to each other. The alignment directions of liquid crystals and polymer material in the composite thin film layer 123 are orthogonal to each other. The first alignment layer 121 and the second alignment layer 125 may be made of polyimide. The composite thin film layer 123 may be replaced by other polymer films, for example, a cholesterol liquid crystal film, a positive dielectric type liquid crystal polymer thin film or a negative dielectric type liquid crystal polymer thin film. The description above is only to illustrate preferred embodiments, not to limit the present invention.

The materials of the first substrate 100 and the second substrate 200 may include metal, high impedance materials of 0.1 MΩ/□ to 100MΩ/□ or glasses. The first substrate 100 and the second substrate 200 are designed as curvature structures of an ellipse, a circle or a Fresnel structure. In addition, the first liquid crystal layer 122 and the second crystal layer 124 may be made of different liquid crystal materials. The first electrode layer 11, the second electrode layer 13 and the third electrode layer 14 may be a conductive film, which may be made of indium tin oxide, wherein the second electrode layer 13 may be a circular pixelated electrode. The hole pattern size of the second electrode 13 may range from 2 mm to 15 mm. The description above is only to illustrate preferred embodiments, not to limit the present invention.

The power line distribution of the first liquid crystal layer 122 and the second liquid crystal layer 124 is to modulate the sparse density of liquid crystal distributions in the first liquid crystal layer 122 and the second liquid crystal layer 124. The power line distribution is controlled by the first electrode 11, second electrode 13, and the third electrode 14 to achieve the effect of positive lens and negative lens.

Figure 2:
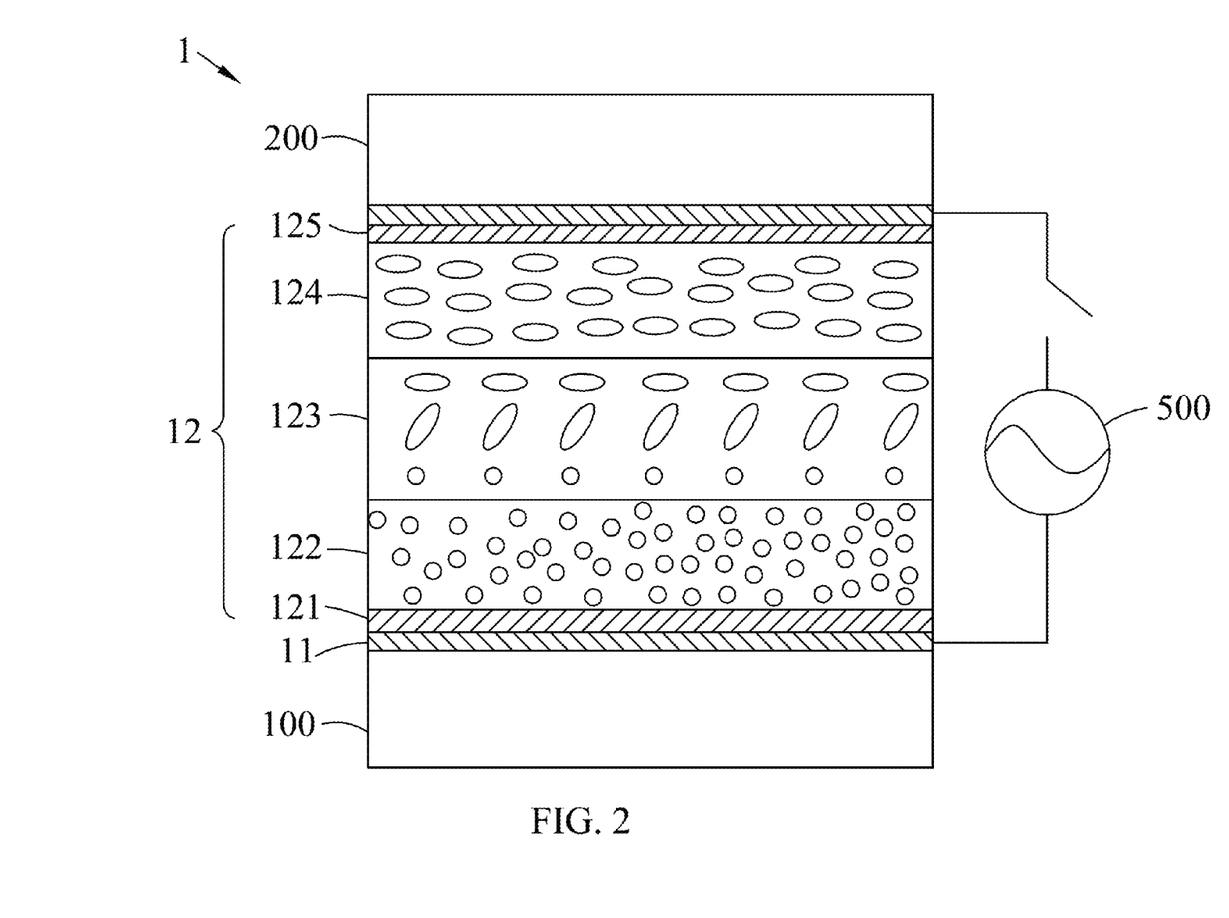
FIG. 2 is a first schematic diagram of phase modulation of a liquid crystal lens structure of the present invention.
Figure 3:
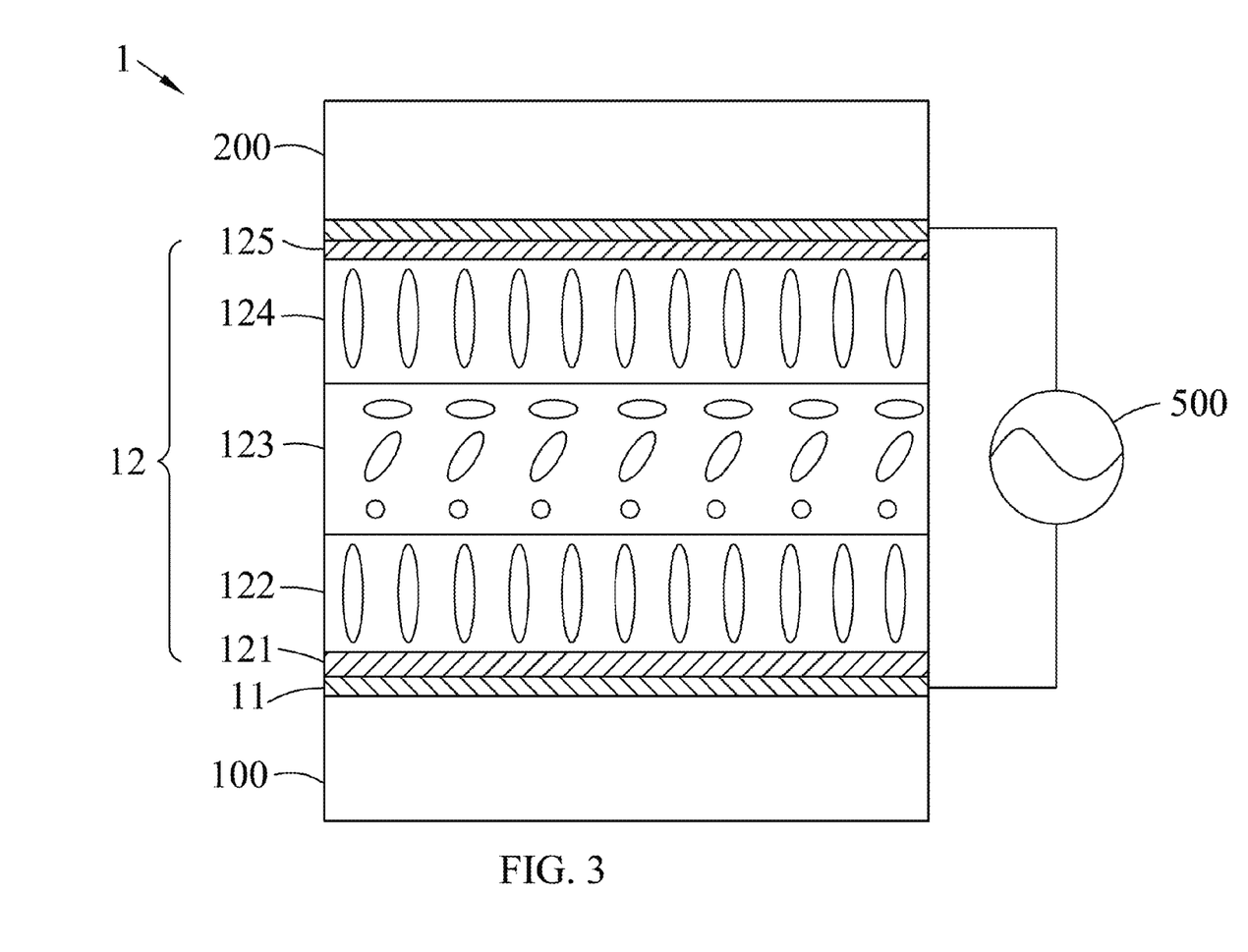
FIG. 3 is a second schematic diagram of phase modulation of a liquid crystal lens structure of the present invention.
Figure 4:
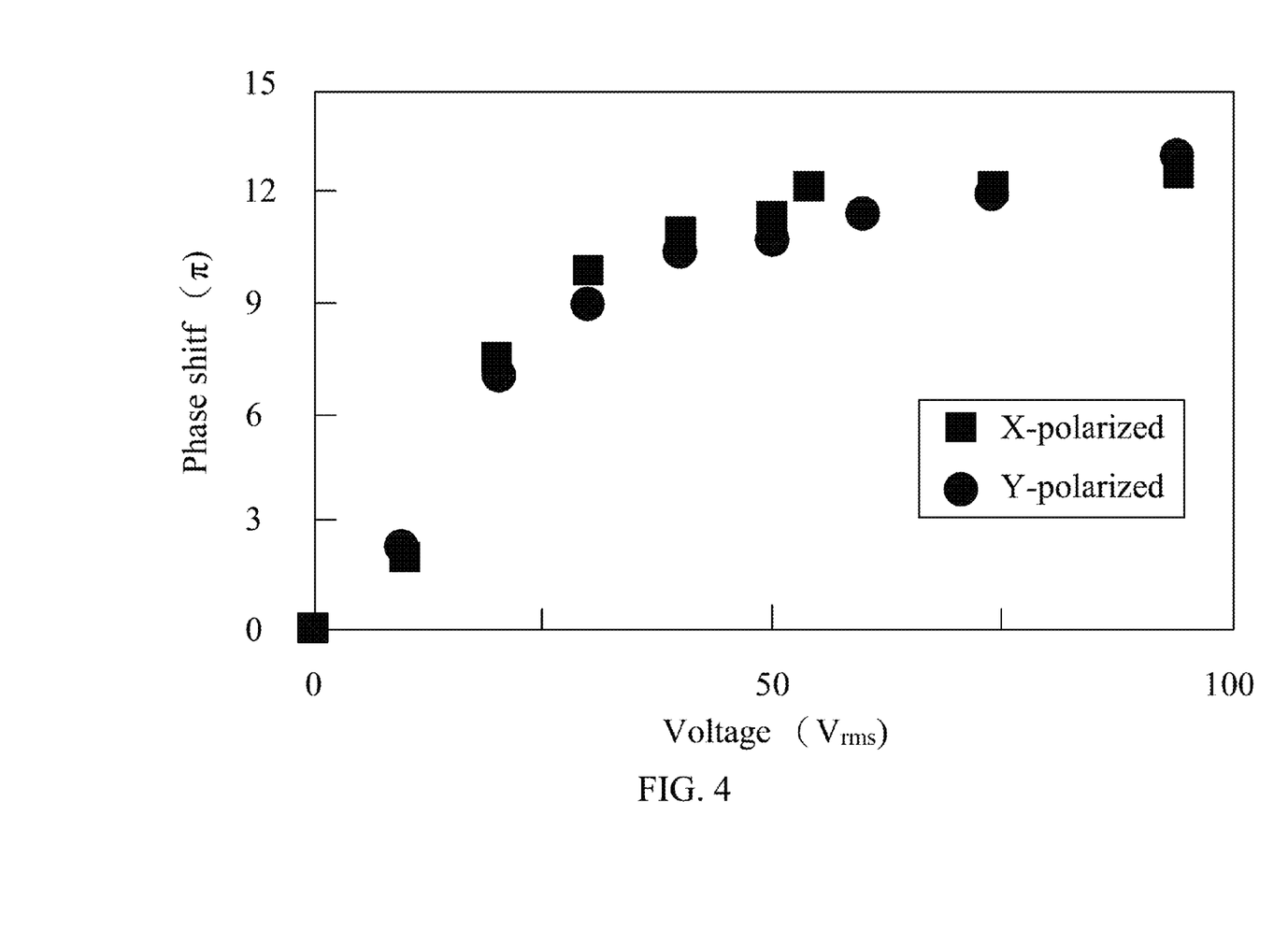
FIG. 4 is an experimental diagram of electrical controlling phase shift of a liquid crystal lens structure of the present invention.

With reference to FIG. 2 to FIG. 3, in which a first schematic diagram and a second schematic diagram of phase modulation of a liquid crystal lens structure according to the invention are depicted. The actuation relationship between components has been depicted in FIG. 1, and is omitted for conciseness. The composite thin film layer 123 is made of liquid crystals and polymer materials, which may replace the glass layer made of conventional liquid crystal phase modulation. Firstly, the first liquid crystal layer 122 and the second liquid crystal layer 124 in the liquid crystal lens structure 1 are taken as an electrode for connecting a power 500 to form a phase modulator as shown in FIG. 2. Next, after driving the power 500, a voltage is applied to the first liquid crystal layer 122 and the second liquid crystal layer 124 as shown in FIG. 3. Finally, it could be noted that with the applied voltages, the liquid crystal arrangements of the first liquid crystal layer 122 and the second liquid crystal layer 124 are parallel to each other. The phase modulator of the liquid crystal lens structure according to the invention is driven by the power 500 to apply a voltage to the liquid crystal lens structure as shown in FIG. 4.

The composite thin film layer 123 is disposed between the first liquid crystal layer 122 and the second liquid crystal layer 124. The composite thin film layer 123 is composed of liquid crystals and polymer materials. The arrangement of liquid crystal molecules within the composite thin film layer 123 may be changed by an external electric field such that the refractive indexes of liquid crystals and polymer materials are matched to form an optical isotropic medium, and the light beam may directly pass through the medium. Therefore, the liquid crystal lens structure 1 may achieve effects of electrically controlling positive lens and negative lens without additionally increasing polarization sheets and coating alignment layers between the liquid crystal layers. The liquid crystal lens structure 1 is electrically controlled to form the positive lenses and the negative lenses or combination thereof, capable of achieving the efficacies of correcting nearsightedness, hyperopia, presbyopia or parallax.

Figure 5:
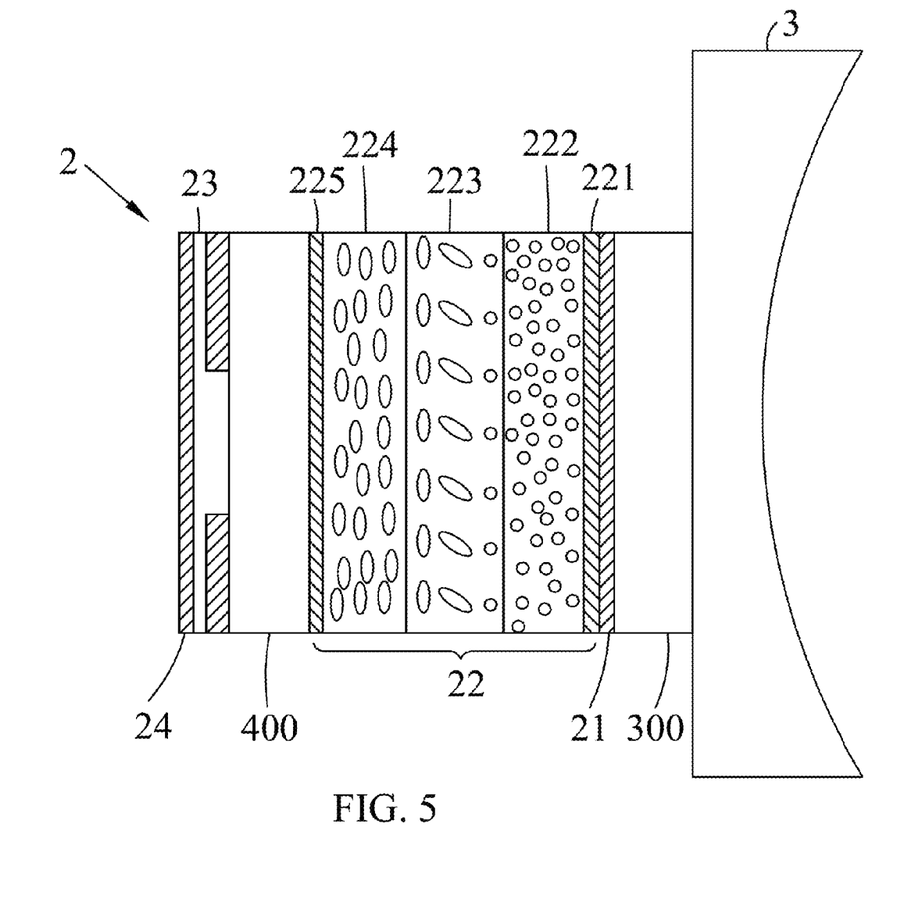
FIG. 5 is a schematic diagram of an electrical controlling liquid crystal lens structure according to an embodiment of the present invention.
Figure 6:
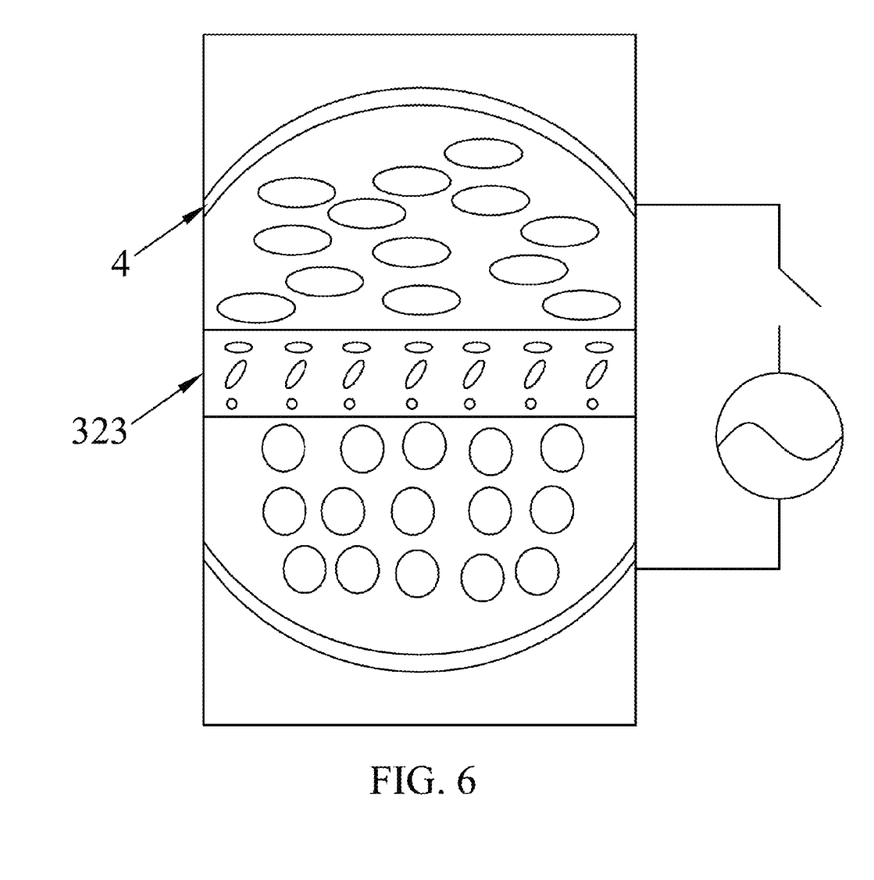
FIG. 6 is a schematic diagram of a composite thin film layer of a liquid crystal lens structure disposed in a non-uniform liquid crystal lens of the present invention.
Figure 7:
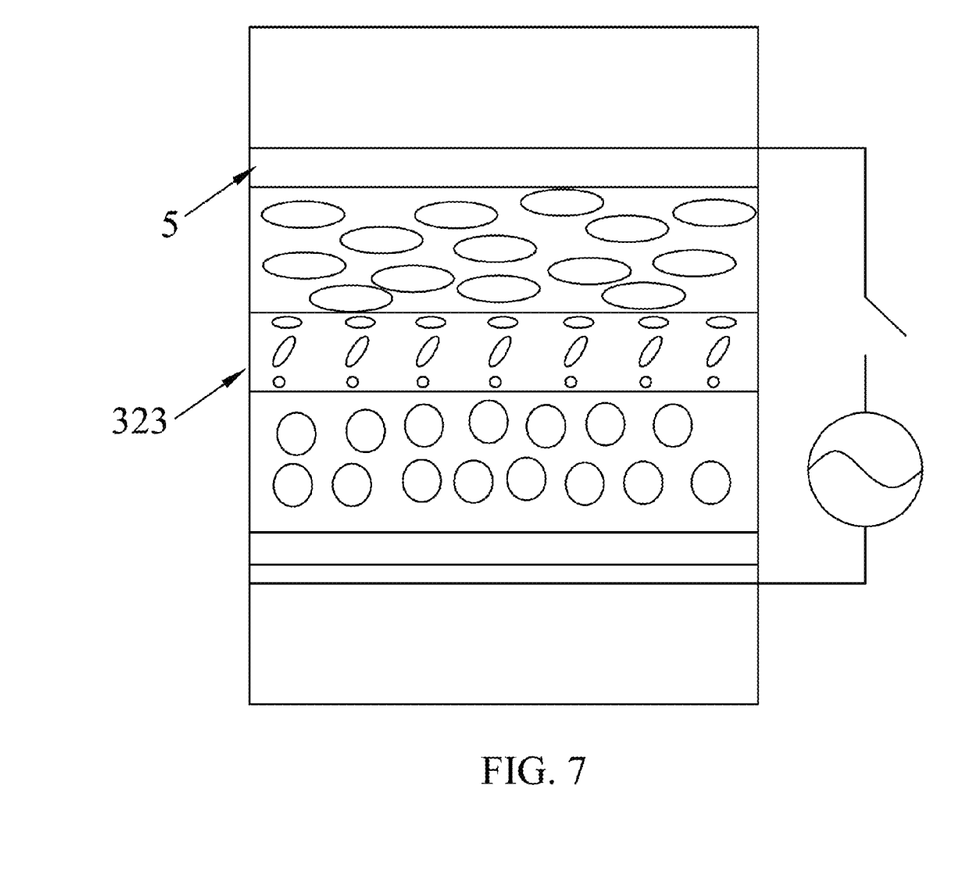
FIG. 7 is a schematic diagram of composite thin film layer of a liquid crystal lens structure disposed in a high impedance liquid crystal lens of the present invention.
Figure 8:
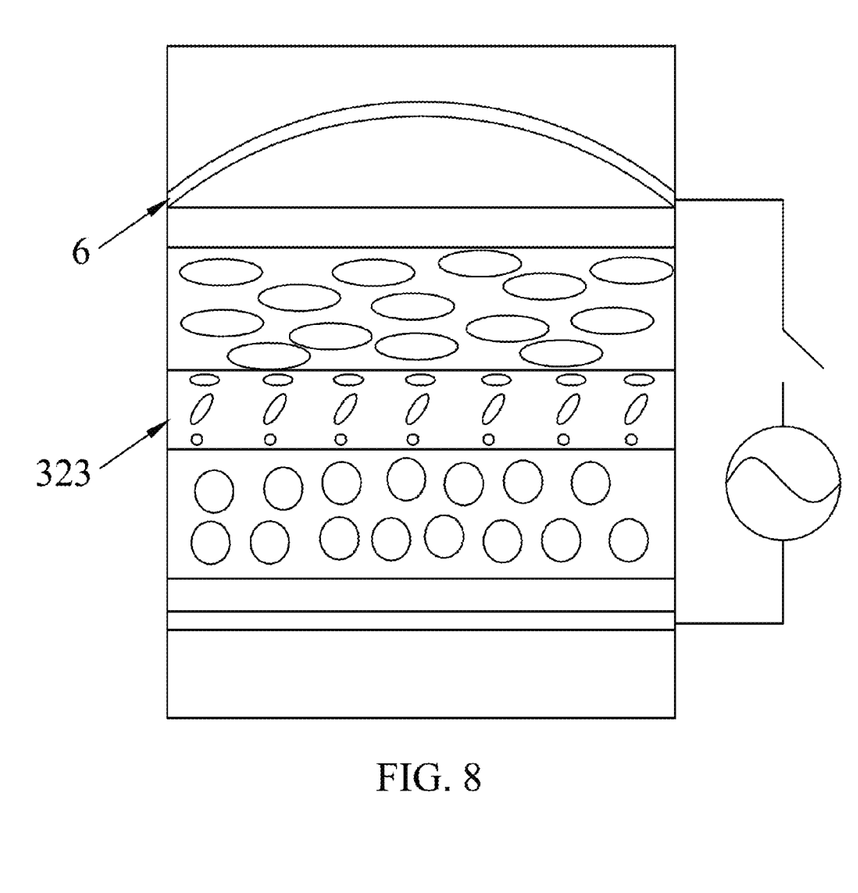
FIG. 8 is a schematic diagram of composite thin film layer of a liquid crystal lens structure disposed in a curvature electrode liquid crystal lens of the present invention.
Figure 9:
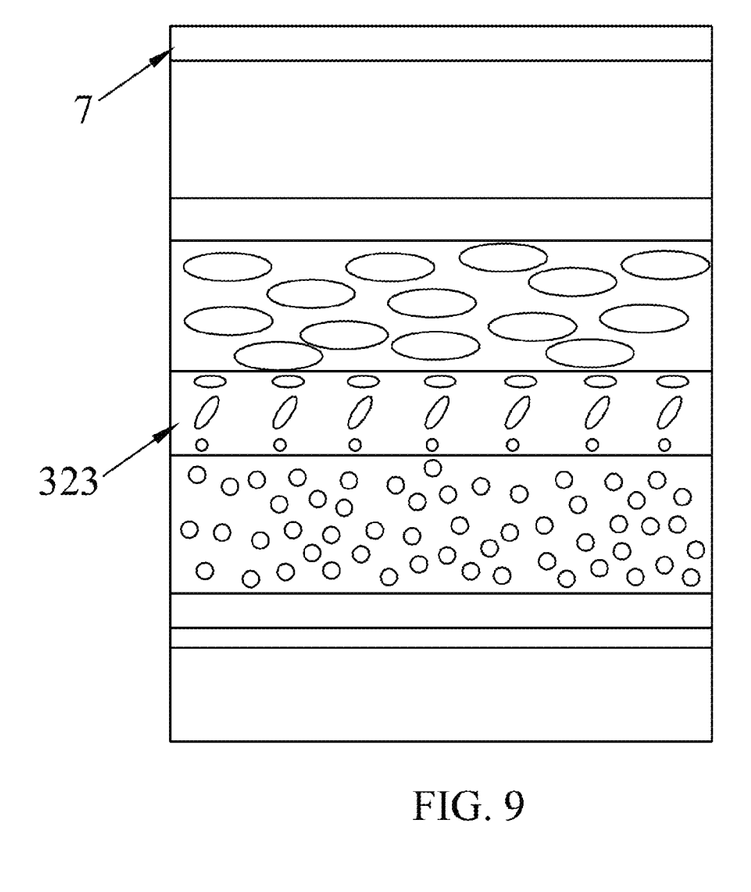
FIG. 9 is a schematic diagram of composite thin film layer of a liquid crystal lens structure disposed in a pixilated liquid crystal lens of the present invention.
Figure 10:
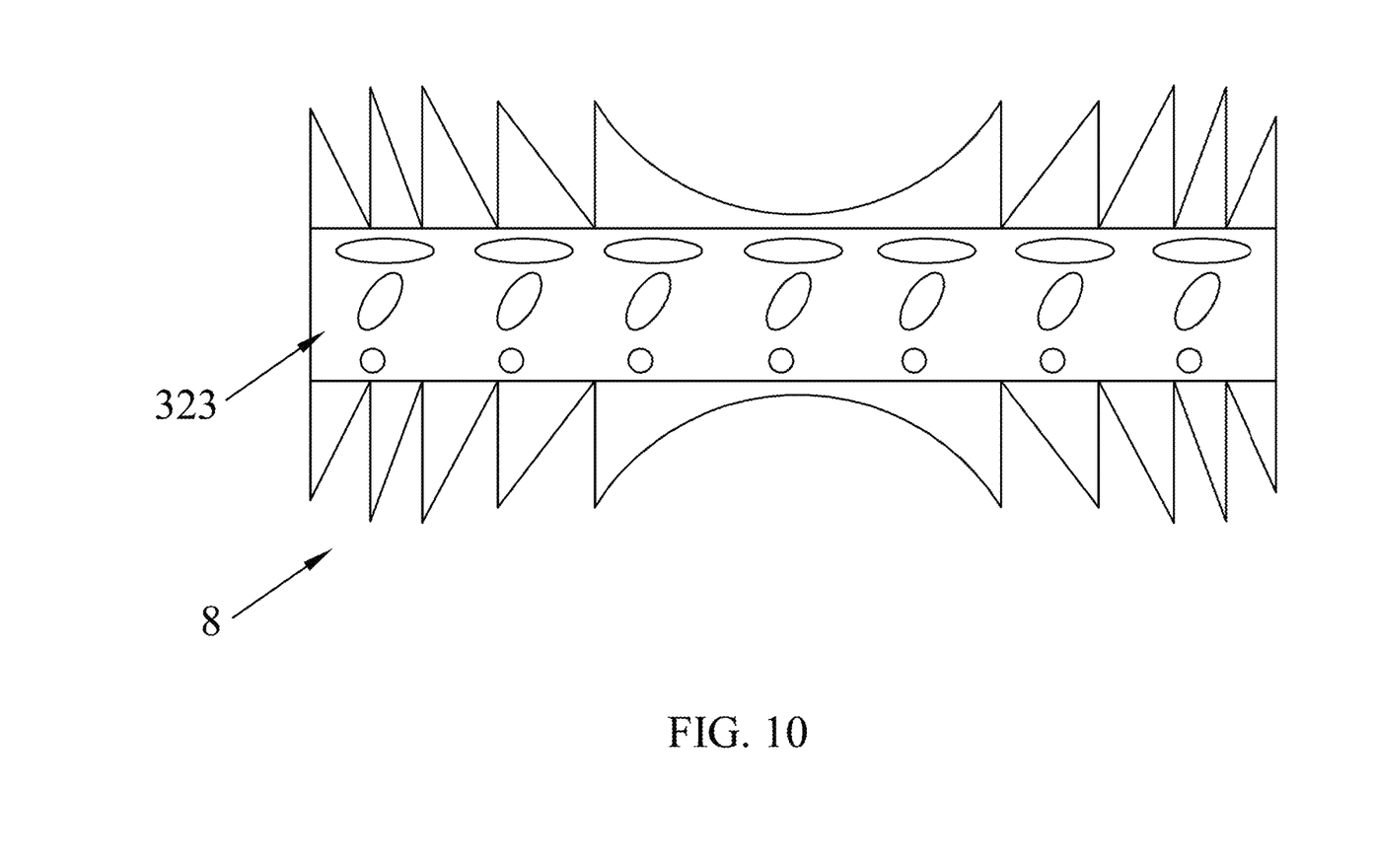
FIG. 10 is a schematic diagram of composite thin film layer of a liquid crystal lens structure disposed in a Fresnel liquid crystal lens of the present invention.
Figure 11:
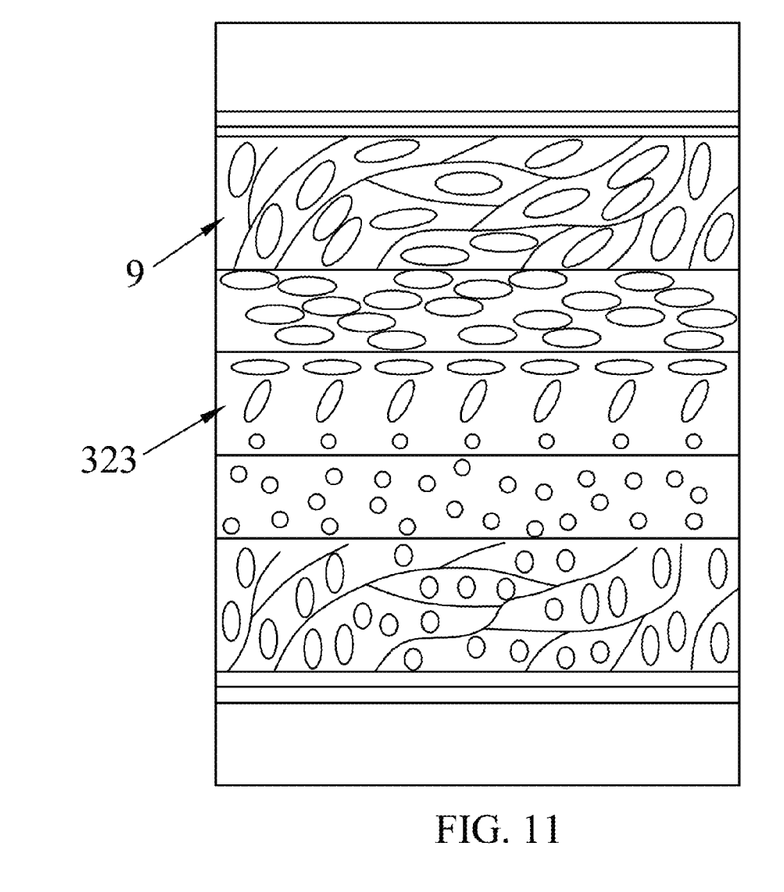
FIG. 11 is a schematic diagram of composite thin film layer of a liquid crystal lens structure disposed in a dielectric distributed polymer film liquid crystal lens of the present invention.

With reference to FIG. 5, in which a schematic diagram of electrical controlling liquid crystal glasses structure according to an embodiment of the invention is depicted. In the embodiment, the liquid crystal lens structure 2 comprises a first substrate 300, a first electrode 21, a composite layer 22, a second substrate 400, a second electrode layer 23 and a third electrode layer 24. The composite layer 22 may include a first alignment layer 221, a first liquid crystal layer 222, a composite thin film layer 223, a second liquid crystal layer 224 and a second alignment layer 225. The first electrode layer 21 is disposed on the first substrate 300. The first alignment layer 221 is disposed on the first electrode layer 21. The first liquid crystal layer 222 is disposed on the first alignment layer 221. The composite thin film layer 223 may include a liquid crystal and a polymer material. The composite thin film layer 223 is disposed on the first liquid crystal layer 222. The second liquid crystal layer 224 is disposed on the composite thin film layer 223. The second alignment layer 225 is disposed on the second liquid crystal layer 224. The second substrate 400 is disposed on the second alignment layer 225. The second electrode layer 23 is disposed on the second substrate 400. The third electrode layer 24 is disposed on the second electrode layer 23. The liquid crystal lens structure 2 is formed by the foregoing arrangement manner.

The materials of the first substrate 300 and the second substrate 400 may include metal, high impedance materials ranging from 0.1 M$\Omega$/□ to 100M$\Omega$/□ or glasses. The first substrate 300 and the second substrate 400 may be designed as curvature structures of an ellipse, a circle and a Fresnel structure. The first electrode layer 21, the second electrode 23 and the third electrode layer 24 each may be a transparent conductive thin film that composed of indium tin oxide. The second electrode layer 23 may be a circular pixel electrode. The hole pattern of the second electrode 23 may range from 2 mm to 15 mm. Further, the first alignment layer 221 and the second alignment layer 225 may be composed of polyimide. The first liquid crystal layer 222 and the second liquid crystal layer 224 may be made of different liquid crystal materials. The composite thin film layer 223 may be replaced by further utilizing other polymer films such as a cholesterol liquid crystal film, a positive dielectric type liquid crystal polymer thin film or a negative dielectric type liquid crystal polymer thin film. The description above is only to illustrate preferred embodiments, not to limit the present invention.

The liquid crystal lens structure 2 and the corrective lens 3 are stacked together. The liquid crystal molecular direction in the composite thin film layer 223 within the liquid crystal lens structure 2 is orthogonal to the direction in which the light beam passes through. The liquid crystal lens structure 2 may be disposed in the middle of the external of the corrective lens 3 as shown in FIG. 5 or can also be disposed to anywhere of the external of the corrective lens 3. The disposition of the liquid crystal lens structure 2 can also be disposed to anywhere of the inside of the corrective lens 3 based upon different corrective purposes of a user. Further, the liquid crystal lens structure 2 can also be disposed into the corrective lens 3. The liquid crystal lens structure 2 may be disposed on the corrective lens 3 through the high temperature pressurization. Further, the liquid crystal lens structure 2 may be disposed to any surface of the corrective lens 3 by utilizing adhesive. The description above is only to illustrate preferred embodiments, not to limit the present invention.

The composite thin film layer 223 of the invention may be applicable to structures of the non-uniform liquid crystal lens 4, the high impedance liquid crystal lens 5, the curvature electrode liquid crystal lens 6, the pixilated liquid crystal lens 7, the Fresnel liquid crystal lens 8 or the dielectric distributed polymer film liquid crystal lens 9 as shown in FIG. 6 to FIG. 11. In addition, the liquid crystal lens structure according to the invention may be applied to systems of a pico-projector, a mobile phone imaging system or other electronically controlled focal length components. The foregoing depiction is, but not limited to, merely preferable embodiments.

The liquid crystal lens structure and the electrical controlling liquid crystal lens structure thereof according to the invention are to replace the conventional glasses structure through a design of a composite thin film layer composed of the liquid crystal and the polymer material such that there is no need to coat the alignment layers or to add polarization sheets between the first liquid crystal layer and the second liquid crystal layer. The alignment effect may be achieved by merely imposing a single voltage to change the distribution of liquid crystal molecules within the composite thin film layer. Accordingly, the operating voltage of the liquid crystal lens structure is low, and the thickness is thinner. While the liquid crystal lens structure is applied in the electrical controlling liquid crystal glasses structure, efficacies of operating the positive lens and the negative lens may be achieved at the same time. Therefore, the liquid crystal lens structure is applied to different kinds of corrective lenses to effectively increase industrial utilization.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A liquid crystal lens structure comprising:
   a first electrode layer;
   a composite layer comprising; and
   a first alignment layer disposed on the first electrode layer;
   a first liquid crystal layer disposed on the first alignment layer;
   a composite thin film layer having a liquid crystal and a polymer material, the composite thin film layer being disposed on the first liquid crystal layer;
   a second liquid crystal layer disposed on the composite thin film layer; and
   a second alignment layer disposed on the second liquid crystal layer;
   a second electrode layer disposed on the second alignment layer; and
   a third electrode layer disposed on the second electrode layer;
   wherein alignment directions of the first alignment layer and the second alignment layer are orthogonal to each other, and alignment directions of the liquid crystal and the polymer material within the composite thin film layer are orthogonal to each other.

2. The liquid crystal lens structure of claim 1, further comprising a first substrate and a second substrate, wherein the first electrode layer is disposed on the first substrate and the second substrate is disposed between the second alignment layer and the second electrode layer.

3. The liquid crystal lens structure of claim 2, wherein materials of the first substrate and the second substrate comprise metal, high impedance materials of 0.1 MΩ/□ to 100MΩ/□ or a glass.

4. The liquid crystal lens structure of claim 2, wherein the first substrate and the second substrate are designed as curvature structures of an ellipse, a circle or a Fresnel structure.

5. The liquid crystal lens structure of claim 1, wherein the first liquid crystal layer and the second liquid crystal layer are made of different liquid crystal materials.

6. The liquid crystal lens structure of claim 1, wherein the liquid crystal lens structure is electrically controlled to form a positive lens or a negative lens or a combination thereof.

7. An electronic controlling liquid crystal lens structure comprising:
   a corrective lens; and
   a liquid crystal lens structure comprising:
   a first electrode layer;
   a composite layer comprising; and
   a first alignment layer disposed on the first electrode layer;
   a first liquid crystal layer disposed on the first alignment layer;
   a composite thin film layer having a liquid crystal and a polymer material, the composite thin film layer being disposed on the first liquid crystal layer;
   a second liquid crystal layer disposed on the composite thin film layer; and
   a second alignment layer disposed on the second liquid crystal layer;
   a second electrode layer disposed on the second alignment layer; and
   a third electrode layer disposed on the second electrode layer;
   wherein alignment directions of the first alignment layer and the second alignment layer are orthogonal to each other, and alignment directions of the liquid crystal and the polymer material within the composite thin film layer are orthogonal to each other, and the liquid crystal lens structure is disposed to any surface of the corrective lens or doped in the corrective lens.

8. The electronic controlling liquid crystal lens structure of claim 7, wherein the liquid crystal lens structure further comprises a first substrate and a second substrate, wherein the first electrode layer is disposed on the first substrate and the second substrate is disposed between the second alignment layer and the second electrode layer.

9. The electronic controlling liquid crystal lens structure of claim 8, wherein materials of the first substrate and the second substrate comprise metal, high impedance materials of 0.1 MΩ/□ to 100MΩ/□ or a glass.

10. The electronic controlling liquid crystal lens structure of claim 8, wherein the first substrate and the second substrate are designed as curvature structures of an ellipse, a circle or a Fresnel structure.

11. The electronic controlling liquid crystal lens structure of claim 7, wherein the first liquid crystal layer and the second liquid crystal layer are made of different liquid crystal materials.

12. The electronic controlling liquid crystal lens structure of claim 7, wherein the liquid crystal lens structure is electrically controlled to form a positive lens or a negative lens or a combination thereof.

* * * * *